United States Patent
Gustafsson et al.

[11] Patent Number: 5,374,134
[45] Date of Patent: Dec. 20, 1994

[54] MECHANICAL COUPLING FOR TORQUE TRANSDUCER

[75] Inventors: Pär Gustafsson; Jan Jeremiasson, both of Västerås; Hans Ling, Spånga, all of Sweden

[73] Assignee: Asea Brown Boveri AB, Västerås, Sweden

[21] Appl. No.: 3,830

[22] Filed: Jan. 8, 1993

[30] Foreign Application Priority Data

Feb. 18, 1992 [SE] Sweden .................. 9200477

[51] Int. Cl.$^5$ .................................. G01L 3/10
[52] U.S. Cl. ................................ 403/365; 403/24; 73/862.321
[58] Field of Search ............. 403/365, 24, 26; 73/862.321

[56] References Cited

U.S. PATENT DOCUMENTS

| | | | |
|---|---|---|---|
| 3,649,058 | 3/1972 | Anderson | 403/365 |
| 3,683,685 | 8/1972 | Viegelahn | 73/136 A |
| 3,858,443 | 1/1975 | Roberts, III et al. | 73/136 R |
| 3,911,736 | 10/1975 | Miller | 73/139 |
| 4,555,956 | 12/1985 | Reich | 73/862.32 |
| 4,712,433 | 12/1987 | Hochstein et al. | 73/862.36 |
| 4,977,782 | 12/1990 | Stöhr et al. | 73/862.29 |

FOREIGN PATENT DOCUMENTS

| | | | |
|---|---|---|---|
| 1391034 | 1/1965 | France | 73/862.321 |
| 1122742 | 1/1962 | Germany | 73/862.321 |
| 206031 | 11/1923 | United Kingdom | 73/862.321 |

*Primary Examiner*—Randolph A. Reese
*Assistant Examiner*—Christopher J. Novosad
*Attorney, Agent, or Firm*—Watson, Cole, Grindle & Watson

[57] ABSTRACT

A mechanical coupling between a drive source and a load object. The coupling includes a tube which at one end is covered with a plate and at its other end is provided with a weak flange with holes for securing the coupling to the drive source by screws. Concentrically in the coupling and to the plate, one end of the transducer shaft is attached. The other end of the transducer shaft is connected to the load object with the aid of a joint.

9 Claims, 1 Drawing Sheet

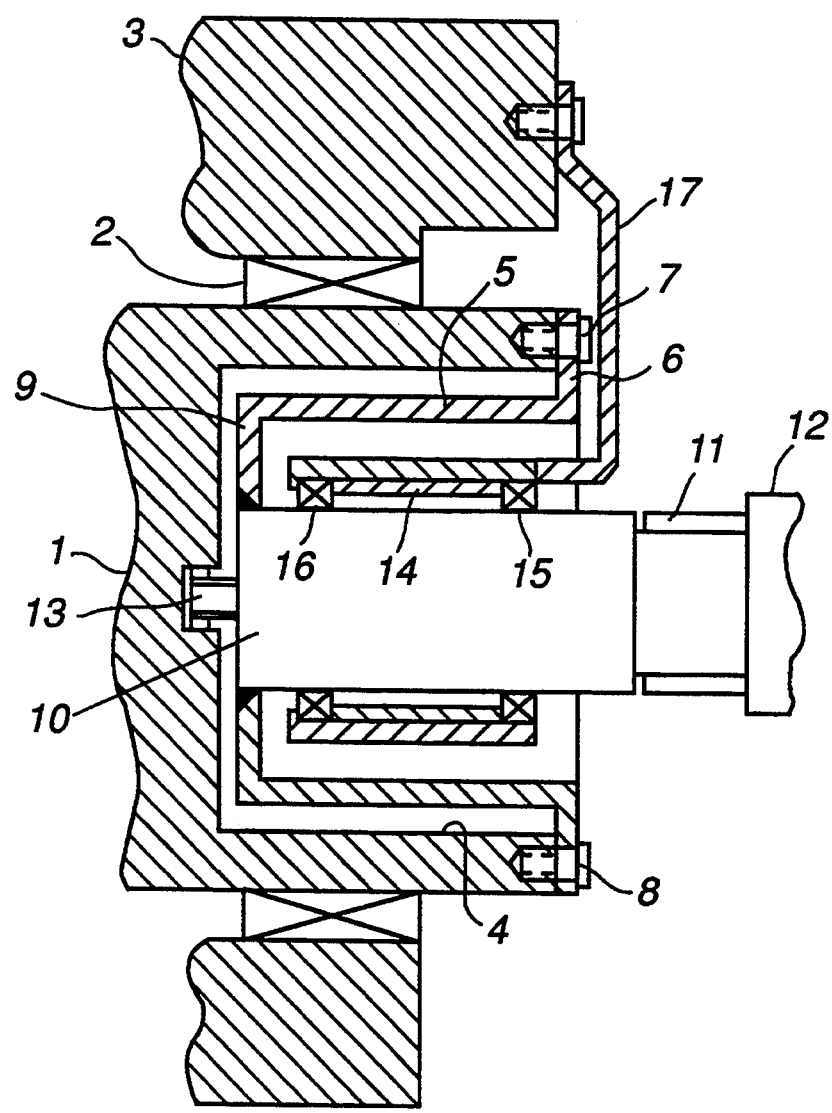

MECHANICAL COUPLING FOR TORQUE TRANSDUCER

TECHNICAL FIELD

In certain applications when the torque on shafts is to be measured, it is required, in addition to the requirement that the torque transducer should be attached so as to be rigid in the direction of rotation, that it should also be connected so as to have low axial and flexural rigidity, which is due to the fact that the shaft has a not insignificant axial movement and bending. Unless special measures are taken, such movements will have a manifestly negative influence on the torque measurement.

Another very important requirement in this connection is that the application of a torque transducer should not be allowed to extend the shaft between the drive source and the load object to any mentionable degree.

An application which requires a torsionally rigid coupling, which still has low axial and flexural rigidity, to obtain a good torque measurement is the attachment of the torque transducer for measurement of the torque in the crankshaft of a car engine between the engine and the gearbox.

The above-mentioned demands for attachment of the torque transducer have previously made it more or less impossible to measure the torque in crankshafts in immediate proximity to the driving motor.

SUMMARY OF THE INVENTION

The invention comprises a specially shaped mechanical coupling between a drive source and a load object which allows attachment of a torque device and makes possible torque measurement under the conditions resulting from the above-mentioned requirements.

Torque measurement in shafts can be performed by means of transducers based on different measurement principles, for example with the aid of strain gauges or with magnetoelastic methods. The torque measurement always takes place within a certain measuring zone or a certain measuring range on the shaft. Concentrically around the measuring zone are mounted torque-sensing or signal-transmitting devices with different designs depending on the measurement principle which will be used.

The coupling according to the invention can be used independently of which measurement principle will be used. As an example of an application, the coupling according to the accompanying figure may be used for torque measurement in the crankshaft of a car engine between the engine and the gearbox or the clutch. The figure also shows how, in principle, a torque-sensing or signal-transmitting device can be fixed in relation to the measuring zone of a shaft.

The coupling according to the invention comprises a relatively thin-walled tube which at one end is covered with a plate and which at its other end is provided with an outwardly-facing weak flange. Via holes in the flange, the coupling is bolted to the crankshaft. That part of the shaft which comprises the measuring zone, the transducer shaft, is fixed concentrically in the thin-walled tube to the plate.

BRIEF DESCRIPTION OF THE DRAWING

The present invention can be more fully understood with reference to the accompanying drawing which is a cross-sectional view of a coupling according to the present invention, for a torque transducer.

DETAILED DESCRIPTION OF THE INVENTION

The present invention relates to a combination including a drive source having an end portion with a recess formed therein, a mechanical coupling drivingly connected to the end portion, a transducer shaft drivingly connected to the mechanical coupling, a load object drivingly connected to the transducer shaft, and a signal transmitting device disposed adjacent the transducer shaft.

The mechanical coupling comprises a thin-walled tube having an inner end, an outer end, a cylindrical inner wall surface, and a cylindrical outer wall surface. The tube extends from the outer end inwardly into the recess. The outer end of the thin-walled tube includes an outwardly extending weak flange which is connected to the end portion of the drive source. The inner end of the thin-walled tube includes an inwardly extending plate portion which is in the shape of a flat ring-shaped plate or plate portion connected to the transducer shaft.

The plate portion has an inner wall defining a central opening therein for receiving the transducer shaft. The transducer shaft has an outer wall, a first end connected at the outer wall to the inner wall of the plate portion, and a second opposite end connected to the load object. The transducer shaft is spaced from and disposed within the thin-walled tube to define an annular space therebetween. Means are provided in the form of a bracket to support the signal transmitting device within the recess and the annular space with the signal transmitting device disposed radially outwardly of the transducer shaft.

An embodiment of the invention is clear from the accompanying figure. A crankshaft 1 is journalled in an engine block 3 by means of a crankshaft bearing 2. The end of the crankshaft extending from the engine block is provided with a hole 4 inside which the coupling is situated. As already mentioned, the coupling comprises the thin-walled tube 5 and the weak flange 6 in which holes 7, 8 are provided for securing the coupling to the crankshaft by screws. The other end of the tube is provided with the plate 9. Concentrically in the cylindrical tube and to the plate, the transducer shaft 10 is fixed. According to the figure, the plate 9 may be provided with a concentric hole adapted to the centering and fixing of the transducer shaft. The other end of the transducer shaft is connected, with the aid of a joint 11, to an automatic gearbox or the clutch or flywheel 12 of the vehicle. The joint may be designed in a number of different ways, for example as a polygon, splines, welded, shrinkage or keyway joint.

In one embodiment the mechanical coupling may be provided with a guide spindle 13 which concentrically extends from the transducer and the plate and which is journalled in some suitable way in the crankshaft.

The coupling may consist of an integrated design where the circular plate, the cylindrical tube and the weak flange are made in one piece, as shown in the figure, or consist of separately manufactured parts which are welded or otherwise fixed to each other.

To obtain a good measure of the torque, the signal-transmitting device should in some way be concentrically coupled to the transducer shaft. In an embodiment according to the figure, this is done by mounting the signal-transmitting device 14 on the transducer shaft by means of transducer bearings 15 and 16. The signal-transmitting device, which is stationary in relation to the rotating shafts, may suitably be fixed to the engine block 3 by means of a clamp 17.

We claim:

1. In combination, a drive source having an end portion, said end portion having a recess formed therein, a mechanical coupling drivingly connected to said end portion, a transducer shaft drivingly connected to said mechanical coupling, a load object drivingly connected to said transducer shaft, and a signal transmitting device disposed adjacent to said transducer shaft, said mechanical coupling comprising a thin-walled tube having an inner end and an outer end, said thin-walled tube extending from said outer end inwardly into said recess, said outer end of the thin-walled tube including an outwardly extending weak flange, said weak flange being connected to said end portion, said inner end of the thin-walled tube including an inwardly extending plate portion, said plate portion being connected to said transducer shaft, said transducer shaft being spaced from and disposed within said thin-walled tube to define an annular space therebetween, and means supporting said signal transmitting device within said recess and said annular space with the signal transmitting device disposed radially outwardly of said transducer shaft.

2. The combination as defined in claim 1, wherein said flange is provided with holes for securing the coupling to the drive source by screws.

3. The combination as defined in claim 1, wherein said transducer shaft has a guide spindle journalled in the drive source.

4. The combination as defined in claim 1, wherein said transducer shaft is connected to the load object by means of a joint.

5. The combination as defined in claim 1, wherein the plate portion has a central hole for receiving the transducer shaft.

6. The combination as defined in claim 1, wherein said mechanical coupling is of one piece construction.

7. The combination as defined in claim 1, wherein said mechanical coupling comprises a separately manufactured plate, a separately manufactured tube, and a separately manufactured flange which are fixed to each other.

8. In combination, a drive shaft, a load object, and a mechanical coupling apparatus between said drive shaft and said load object and connected to both, said drive shaft having a first end, said first end being connected to said mechanical coupling apparatus and having a recess therein for housing said apparatus while allowing axial and flexural movement thereof, said mechanical coupling apparatus comprising a mechanical coupling, a transducer shaft, and a signal-transmitting device, said mechanical coupling comprising a thin-walled tube having first and second opposite ends, an inner wall, an inner diameter, an outer wall and an outer diameter, said first end of said thin-walled tube being covered with a flat ring-shaped plate having opposite surfaces, an outer wall connected to the first end of said tube and defining an outer diameter of said plate, and a circular inner wall defining an inside diameter which is smaller than said outer diameter of said plate, said second end of said thin-walled tube being provided with an outwardly-facing weak flange having opposite surfaces which face toward and away from said first end of the tube, respectively, said surface of the flange which faces toward said first end of the tube contacting said first end of the drive shaft and being connected thereto, said transducer shaft having an outer wall, a first end connected at said outer wall to the inner wall of said plate and a second opposite end connected to said load object, wherein said transducer shaft is arranged concentrically in said tube and the diameters of the thin walled tube and transducer shaft are such that an annular space is provided within said recess and between the inner wall of the tube and the outer wall of the transducer shaft, and said signal-transmitting device is arranged within said annular space.

9. A combination as defined in claim 8, wherein said signal transmitting device is completely disposed within said recess.

* * * * *